United States Patent [19]

Basek

[11] Patent Number: 5,338,078
[45] Date of Patent: Aug. 16, 1994

[54] LAWN AND GARDEN TOOL FOR THE REMOVAL OF GROUND PLUGS

[75] Inventor: Charles Basek, Oakville, Canada

[73] Assignee: Lawn Claw International Inc., Christ Church, Barbados

[21] Appl. No.: 74,603

[22] Filed: Jun. 11, 1993

[51] Int. Cl.$^5$ .................................................. A01B 1/24
[52] U.S. Cl. ..................................... 294/50.5; 172/22; 294/50.7
[58] Field of Search ...................... 294/50, 50.5, 50.6, 294/50.7, 50.8, 60, 61; 30/128, 130, 316; 73/864.44, 864.45; 111/92, 101, 106; 172/21, 22, 25, 371, 378, 380, 381; 254/132

[56] References Cited

U.S. PATENT DOCUMENTS

| | | | |
|---|---|---|---|
| 342,516 | 5/1886 | Iwan et al. | 294/50.7 X |
| 375,556 | 12/1887 | Madden | 294/50.7 |
| 488,918 | 12/1892 | Clark | 294/50.7 X |
| 809,476 | 1/1906 | Thayer | 294/50.7 |
| 840,903 | 1/1907 | Bucknall | 294/50.7 |
| 933,227 | 9/1909 | Billau | 294/50.6 X |
| 1,039,012 | 9/1912 | Behrendt | 294/50.7 X |
| 1,065,456 | 6/1913 | Lowrey | 294/50.6 |
| 1,647,832 | 11/1927 | Kovar | 294/50.5 |
| 2,018,279 | 10/1935 | Norcross et al. | 294/50.6 X |
| 2,030,770 | 2/1936 | Smith | 294/50.7 X |
| 2,686,690 | 8/1954 | Kushnir | 294/50.7 |
| 3,333,881 | 8/1967 | Hollinger | 294/50.6 X |
| 3,443,830 | 5/1969 | Jones | 294/50.7 |
| 4,603,744 | 8/1986 | Ramirez | 294/50 X |
| 4,819,735 | 4/1989 | Puckett | 294/50.7 X |
| 5,005,888 | 4/1991 | Parks et al. | 294/50 |

FOREIGN PATENT DOCUMENTS

| | | | |
|---|---|---|---|
| 137681 | 4/1930 | Switzerland | 294/50.7 |
| 179360 | 11/1935 | Switzerland | 294/50.8 |
| 865902 | 4/1961 | United Kingdom | 294/50.7 |

*Primary Examiner*—Johnny D. Cherry
*Attorney, Agent, or Firm*—John C. Hunt

[57] ABSTRACT

A lawn and garden tool for removal of plugs of earth from the ground. The tool has a plurality of blades rigidly affixed at the lower end of an elongate shaft, an earth-receiving channel being defined between inner surfaces of the blades. The inner surfaces of the blades are arcuate, generally being congruent with the curved surface of a circular cylinder aligned with the shaft. There are ledges defined around the periphery of the channel so that when the the blades are withdrawn from the ground, a plug of earth is held within the channel. In the disclosed embodiment, each ledge is defined along a lower edge of a lateral indentation of a blade. In each blade there is a pair of axially spaced indentations and a region of the blade between the indentations is directed radially inwardly of the circular cylinder to enhance the plug withdrawal capability of the tool. An upwardly biased plunger is included for ejection of a plug withdrawn from the ground.

22 Claims, 4 Drawing Sheets

LAWN AND GARDEN TOOL FOR THE REMOVAL OF GROUND PLUGS

FIELD OF THE INVENTION

This invention relates to a lawn and garden tool. Particularly, this invention relates to tools for removal of plugs of earthen material from the ground.

BACKGROUND OF THE INVENTION

A garden tool for removing plants having roots from the ground is described in U.S. Pat. No. 5,005,888, which issued to Parks et al. Apr. 9, 1991. This document discloses a tool having a prong assembly, there being four prongs, each of which is shown to be generally in the shape of a circular cylinder, the lower edges being chamferred.

As described at column 2, lines 20 to 24, the tool appears to require at least two full rotations of the prongs to assure formation of a ground plug.

BRIEF SUMMARY OF THE INVENTION

The present invention provides a manual agricultural tool for removal of plugs from earthen ground. The tool includes a shaft having a central axis and a handle at a top end of the shaft for manipulation of the tool. There is a plurality of blades rigidly secured at a lower end of the shaft by a support member extending between the blades. The blades depend downwardly of the support member and are spaced radially outwardly of the axis so as to be generally centered about and parallel to the axis. Each blade has an inner concave surface and the blade surfaces together with the support member define a downwardly open receiving channel such that the blades may be axially inserted into the ground. The handle is used to rotate the tool about the axis such that a plug of earth is formed within the channel and held therein for removal from surrounding earth upon subsequent withdrawal of the tool from the ground.

Preferably, at least one of the blades, and most preferably, all of the blades each defines a ledge located along its inner surface, which ledge is oriented upwardly so as to come into abutting contact with an outer portion of the plug of earth to facilitate holding of the plug within the channel during withdrawal of the tool from the ground.

In the preferred embodiment tool, described in detail below, each blade has an indentation oriented to receive earth therein when the tool is rotated and the ledge is defined along a lower edge of the indentation. Preferably there are two such indentations, spaced axially from each other, and two such ledges.

Preferably, each indentation is located such that when the tool is rotated in a first direction, say clockwise, the indentation is located along a following edge of the blade.

Preferably, the region of the blade between the two indentations is directed radially inwardly of the blade surfaces defining the channel so as to protrude slightly into the channel.

DETAILED DESCRIPTION OF A PREFERRED EMBODIMENT

Figure 1:
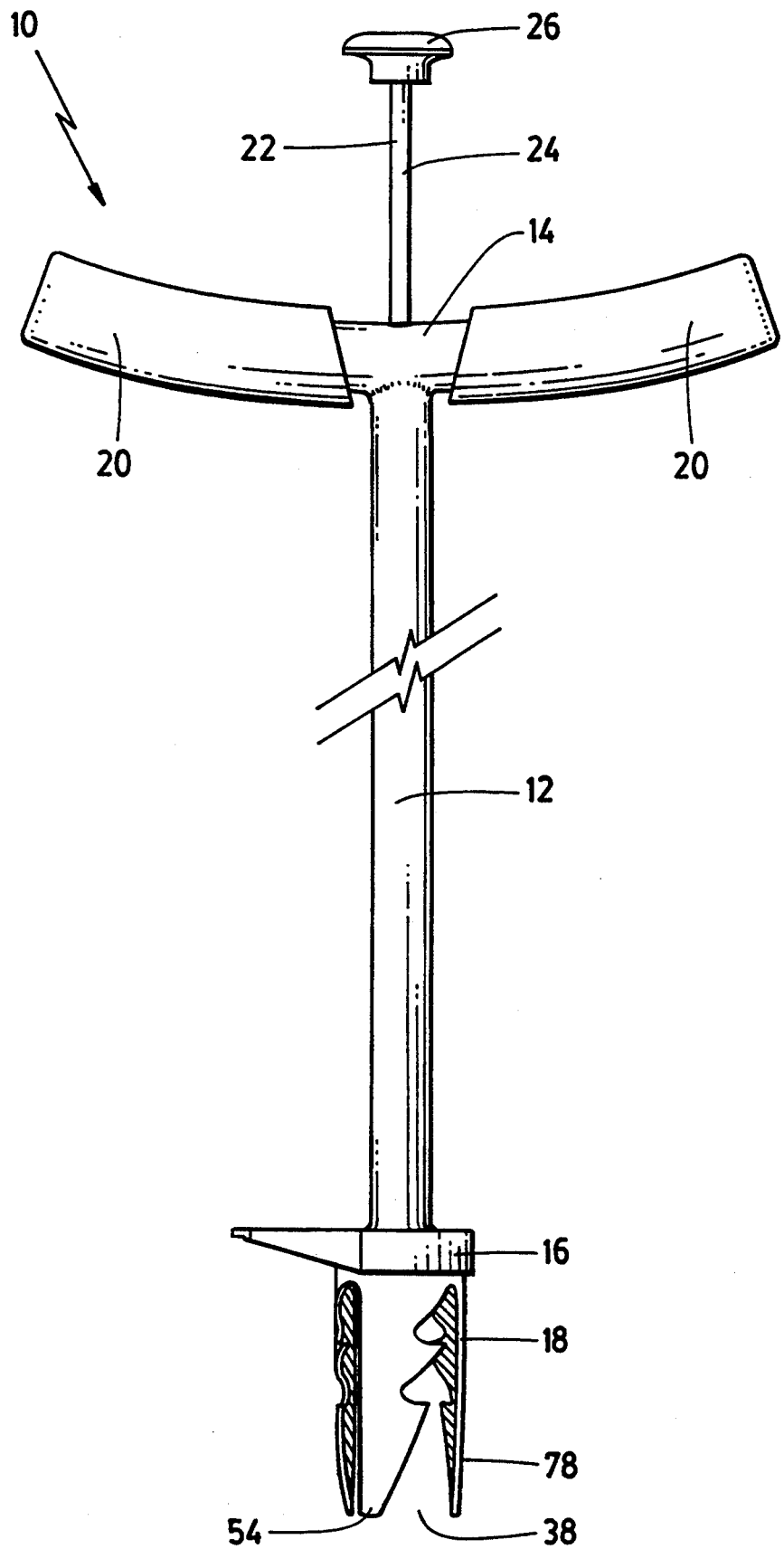
FIG. 1 is a side view in elevation of the preferred embodiment.

Turning to the drawings, a preferred embodiment lawn and garden tool 10 is shown in FIGS. 1 to 4. Tool 10 includes hollow shaft 12 having handle 14 rigidly affixed at its top end and foot support 16 and blades 18 at the lower end of the shaft. The handle has a tubular plastic member 20 slipped over each of its ends Plunger 22 including rod 24 upper knob 26 and lower plate 28 is biased upwardly by compression spring 30 which is located within the hollow shaft.

The three blades 18, rigidly secured at the bottom end of the shaft, are arranged symmetrically about a center line or axis of the shaft. The blades are essentially identical to each other in the disclosed embodiment. The blades and connecting roof support member 32 are of unitary construction, being stamped and shaped from a single piece of metal. The connecting roof is in the form of a disc and extends between the blades. The top portion of the blades blend together in ring 34 encircling the upper portion of the blade unit. Each blade has an inner concave surface 36, which surfaces together with the support member define a downwardly open receiving channel 38 for earth or dirt.

Blades 18 are laterally or circumferentially spaced apart from each other. Each blade has a pair of indentations 40, 42, the first of these being spaced axially upwardly of the other to be located axially closer to the base of the shaft than the other. Lower edge 44 of the upper indentation and upper edge 46 of the lower indentation meet each other to form pointed tooth 48. Lower edges 50, 52 meet at a lower rounded tip 54 of each blade. Edge 50 and lower edge 56 of lower indentation 42 also meet to form pointed tooth 58. The inner curved surfaces 36 of the blades lie generally on, that is, are congruent with, a curved surface of an imaginary circular cylinder, but tips 60, 62 of teeth 48, 58 respectively, extend radially inwardly of the imaginary cylindrical surface so as to spiral radially inwardly toward the axis of the shaft. Lower edge 44 of the upper indentation is generally orthogonal to the central axis of the shaft, while its upper edge 64 forms an angle of approximately forty-five degrees with the central axis, inner bight 66 of the indentation being rounded.

Connected to the base of shaft 12 above the blade unit is foot support 16. Radially extending portion 68 of the support is dimensioned and located such that a person's foot may be located thereon, if need be, for driving insertion of the blades into the ground. The support includes a cup portion 70, the inside of the cup being complementarily shaped for receipt of the top portion 72 of the blade unit. The underside of the foot support thus has a cavity congruent with a right circular cylinder for abutting receipt of the blade unit therein.

Figure 3:
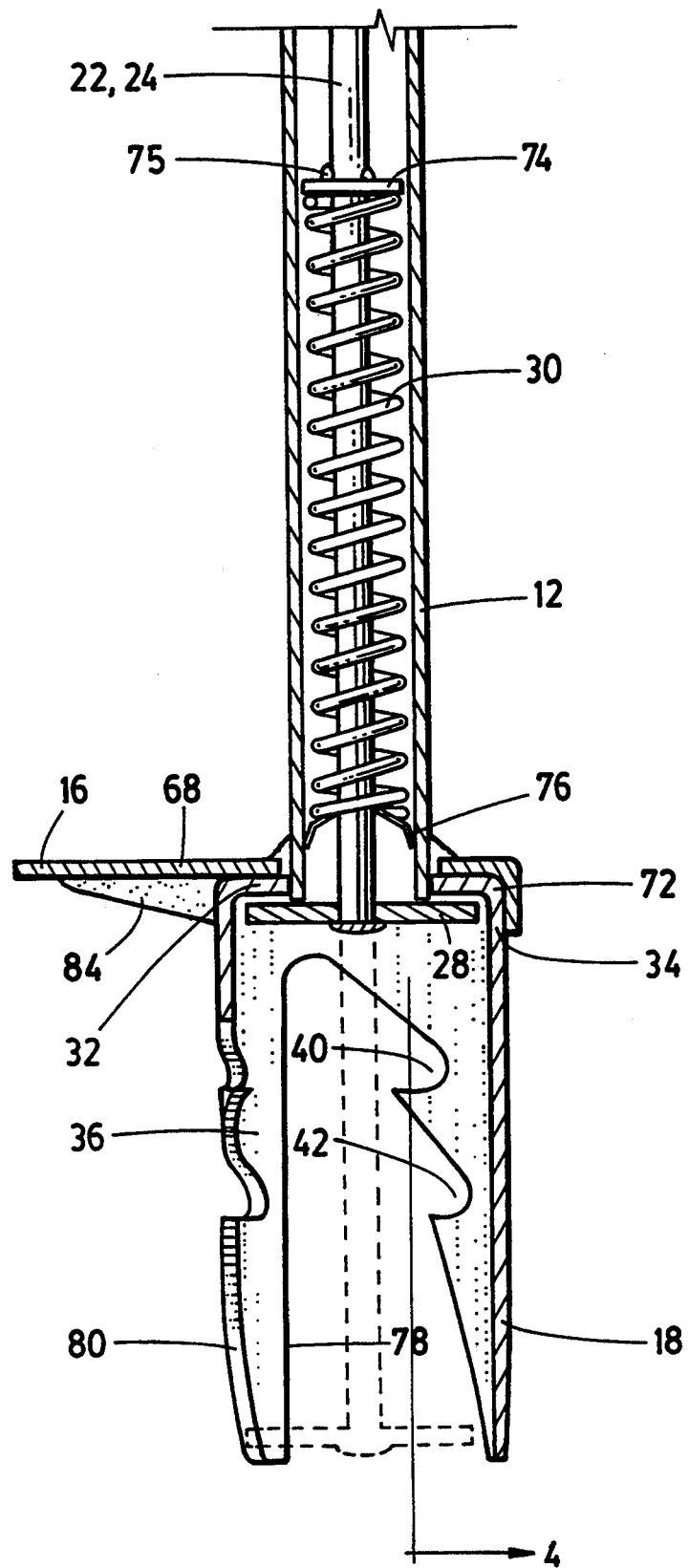
FIG. 3 is a sectional view of the lower end of the FIG. 1 embodiment taken along 3—3 of FIG. 2.

Exending through the hollow center of the shaft is plunger rod 24. Compression spring 30 spirals around the rod between plate 74, which extends radially outwardly of the rod and member 76, which extends radially inwardly of the shaft. Rod plate 74 is a ring or washer in abutting contact with rod portions 75 struck in the metal rod to protrude radially outwardly of the rod. Member 76 is a flexible spring clip jammingly inserted against the inner wall of the shaft. Member 76, of course, has a central aperture to accommodate reciprocal movement of the rod therethrough. The spring is in a compressed state to abut plate 74 and member 76 so as to bias the plunger into its upper position as illustrated in FIG. 3. The lower position of the plunger is shown in phantom in FIG. 3.

To the bottom end of the plunger is affixed by a press weld circular plate 28 and to the top end, or head of the plunger is knob 26.

The tool shaft, handle, foot support and blades are of commercial quality steel (1010). The handle is welded at the top end of the shaft while the foot support and blade unit are welded at the lower end of the shaft. The foot support and blade unit are stamped pieces. The lower end of the shaft extends through circular openings in the foot support and blade unit for assembly thereof. The opening in the foot support is slightly larger than that in the blade unit to ensure a sufficiently strong mig welded joint between the three pieces. Of course, any fastening technique which provides a sufficiently strong joint can be employed: tik welding, resistence welding, etc.

The shaft of the disclosed embodiment is about twenty-nine inches (about 74 cm). The blade unit is about ⅜ inches (about 9.5 cm) in height from the topside of the unit to the lower tips of the blades.

The method of use of the tool is more or less the same, regardless of the use to which it is being put. Generally speaking, the tool is located on the ground surface and then pushed downwardly so that the blades pierce the ground. Usually, the blades would be inserted such that the underside of the plunger plate comes into contact with the ground, that is, such that the receiving channel is more or less full of ground material. The tool is manipulated by means of the handle which is used to twist or rotate the blades in the ground, in a clockwise direction (as viewed from above) sufficient to cut out a ground cylindrical plug. It may be sufficient, where no roots are entangling the ground material, that the leading edge of one blade be moved to pass slightly by the originating position of the following edges of the adjacent blade towards which it is rotated during the plug-forming operation. In the case of weed removal, for example, it may be necessary to move the tool a greater rotational distance in order to fully release root material from surrounding earth.

In any case, once the tool has been turned sufficiently to form a plug of earthen material held within the channel, the handle is used to draw the tool blades out of the ground, the plug of earth being located in the channel.

Once a plug has been withdrawn from the ground, it can be ejected from the tool channel by use of the plunger. Knob 26 is simply pressed toward handle 14 to move plunger rod 24 and the plate 28 downwardly relative to the shaft. The plate moves axially downwardly through the channel 38 from its upper position illustrated in FIG. 3 to its lower position, shown in phantom in the same figure, and the plug expelled.

Figure 4:
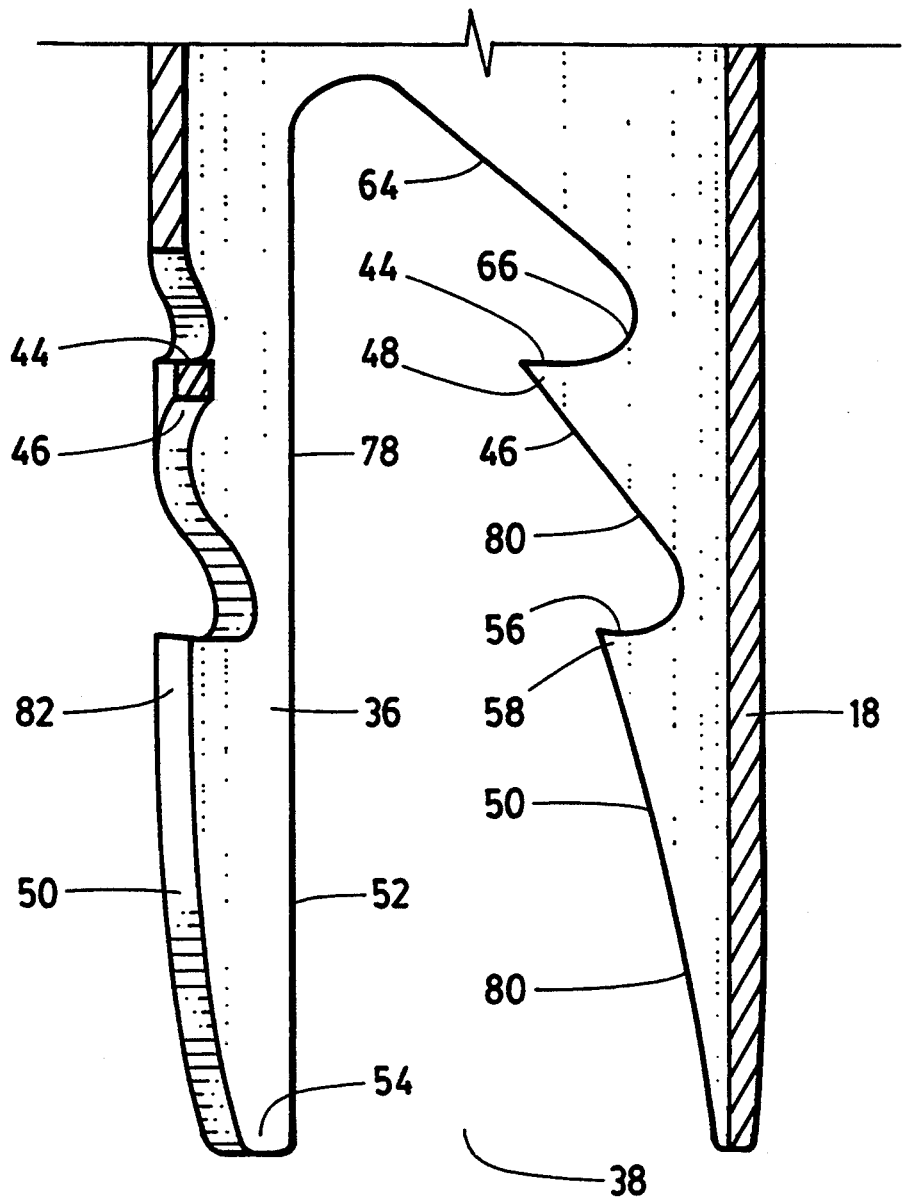
FIG. 4 is a sectional view of a portion of a blade of the FIG. 1 embodiment taken along 4—4 of FIG. 3, the sectional cut being in a plane which contains a central axis of the shaft of the tool.

As mentioned above, the tool is rotated in a clockwise direction, as viewed from above, after insertion into the ground. Each blade thus has leading edge 78 and following edge 80. The indentations of each following edge are thus located along the following edge of the blade. The indentation opens laterally such that earth can be accepted into the bight of the indentation. Insofar as there is a thickness to the blade, each edge includes face 82. The lower edge face of each indentation acts as a ledge for earthen plug material. Lower edge 44 of the first indentation forms an approximate right angle with (is about orthogonal to) the central axis of the shaft as seen in FIG. 4, but the orientation of the edge could be varied. A deviation of the angle of up to plus or minus fifteen degrees from the right angle shown would likely work, but may be less suitable. The ledge is oriented such that its face has an upwardly facing horizontal component and a radially outward portion of the plug of earthen material can come into supporting or abutting contact with the ledge face as the tool is withdrawn from the ground. To the extent that earthen material accepted into the indentations clings or otherwise attaches to material within the channel defined between the blades, ground withdrawal capability of the disclosed blade arrangement is enhanced. Orientation of an indentation to receive earth therein above the ledge as the tool is rotated thus facilitates holding or retention of the plug to be removed from the ground within the channel defined by the blade unit during subsequent withdrawal of the tool from the ground.

Face 82 of leading edge 78 lies generally in a plane containing a radius of the central axis, but it could, if desired, be oriented so to be angled inwardly, that is, to form an acute angle with a radius extending from the central axis of the shaft to the forward tip of the leading edge. To the extent that earthen material in contact with the face during rotation of the tool is forced radially inwardly into the channel by the face, compacting of plug material can be enhanced.

As described above, the following edge of each blade between the axially spaced apart indentations extends radially inwardly of the circular cylinder with which the inner curved surfaces of the blade assembly are congruent. It is thought that such an arrangement further enhances the plug-holding ability of the tool. By protruding into the side of a plug within the channel, there is some assurance that the radially inwardly directed portion will act as a ledge for plug material located axially above it and within the confines of the circular cylinder with which the greater part of the inner surface of each blade is congruent. Further, as the tool is rotated, the radially inwardly protruding inner surfaces which spiral radially inwardly toward the shaft axis can force soil in contact therewith radially inwardly to enhance compactment of the soil. In the disclosed embodiment, both teeth of each blade extend radially inwardly of the cylinder. Upper tooth 48 is directed inwardly of the radius of the receiving channel at its tip. The inner surface of the tip and the surface of the circular cylinder form an angle of between about three degrees and about five degrees. Lower tooth 58 is similarly directed inwardly of the radius of the receiving channel at its tip. More or less curvature of the tips inward of the cylindrical surface with which inner blade surfaces are otherwise congruent is possible.

The thickness of the blades of the preferred embodiment is approximately 3/32 inches (about 2.5 mm) In longitudinal section taken through a radius of the central axis of the shaft, (i.e., in which the plane of the sectional cut contains the central axis of the shaft) as shown in FIG. 4, it can be seen that face 82 of each of the edges 44, 46 generally forms a right angle with a line parallel to the central axis of the shaft.

Faces could be angled inwardly such that the inner angle between the face of, say, edge 44 and the central axis could be smaller than ninety degrees. Such an angled arrangement of blade edges could further enhance the ground-gripping ability of the blade unit. As the tool is rotated by means of the handle in a clockwise direction (as viewed from above), there would be a tendency for earthen material in direct contact with such an angled surface to be forced radially inwardly. To the extent that material is forced radially inwardly by such angling of the edges and to the extent that earthen material within the channel is compacted and thereby more tightly bound together, the integrity of the plug material would be enhanced and withdrawal within the blade assembly facilitated.

The lower tip of each blade is shaped, i.e., rounded, to facilitate insertion into the ground. The tip edge can also be canted inwardly (i.e., in longitudinal cross section in which a plane of the section cut contains the central axis of the shaft, the blade edge can be shaped to form an acute angle with a line parallel to the shaft axis) so as to more easily slice through ground material and to some extent force material into the receiving channel of the blade unit.

In any case, foot support 16 is provided to facilitate insertion of the tool blades into the earth. The support is rigidly affixed at a lower location of the tool and radially extends from the shaft to an extent sufficient that a person's foot may be located thereon and pressed downwardly for driving insertion of the blades into the ground.

Figure 2:
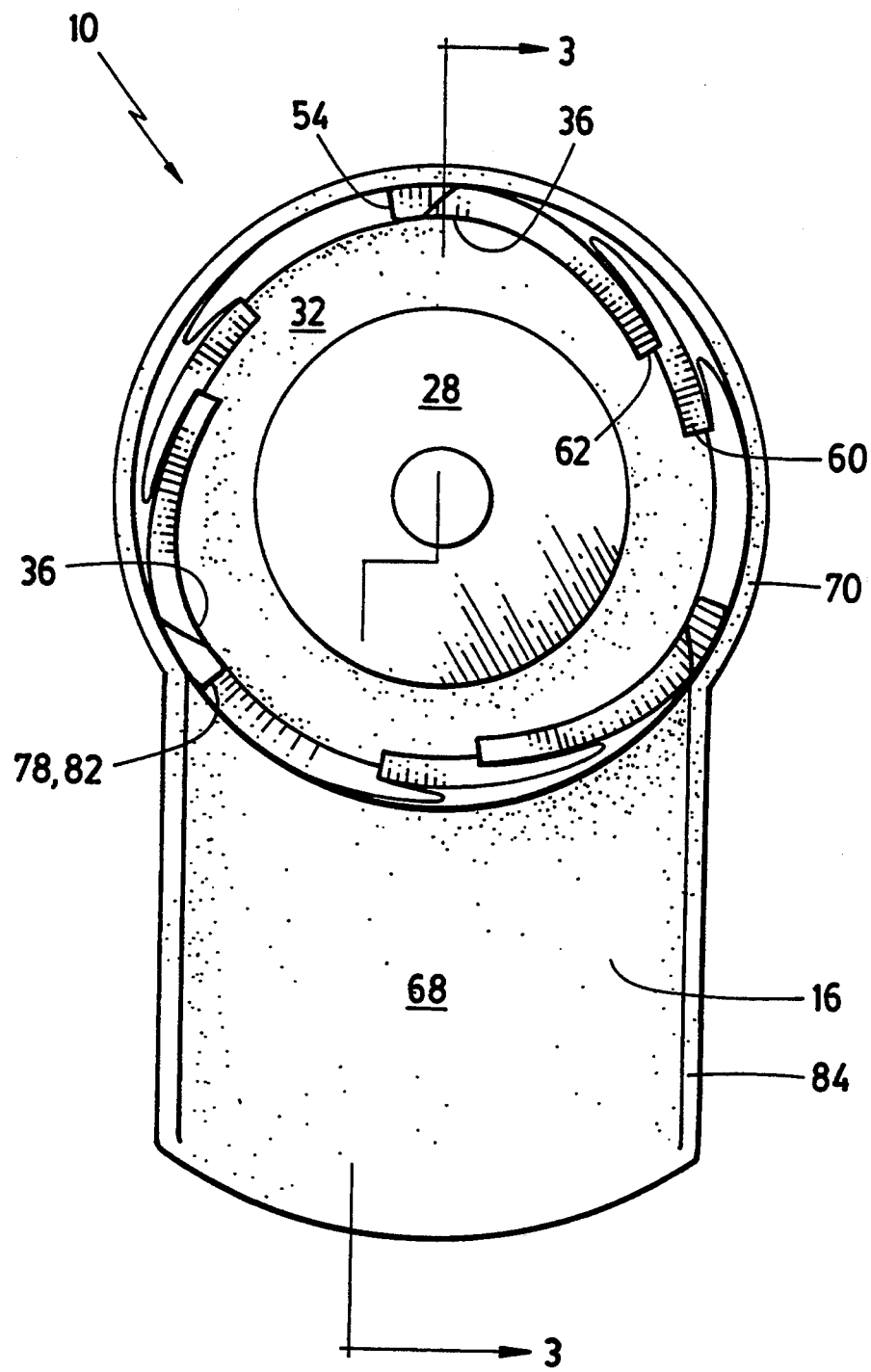
FIG. 2 is a bottom plan view of the lower portion of the FIG. 1 embodiment.

It will be appreciated from FIG. 2 that downwardly depending edges 84 of the foot support extend downwardly to about the height of the underside of the plunger plate. Since the tool would generally be inserted such that the top of the ground reaches (at most) to the underside of the plate, the downwardly depending edges do not generally inhibit rotation of the tool once inserted into the ground.

It will be appreciated that the ease of use and effectiveness of the disclosed tool is affected by ground conditions. It is easier to insert a tool into soft ground than hard. On the other hand, it is expected with this tool, or at least with the preferred embodiment, to be possible to obtain results superior to those obtainable with conventional tools. That is, the ledges of the blades should enhance the ability of this tool to retain a ground plug within its channel during withdrawal of the tool from the ground over tools not having such a ledge.

Further, the disclosed tool can be effective in removal of earth plugs without the presence of roots in the plug material being extracted. The tool can thus be used in applications in addition to its use as a weeding device.

As a lawn maintenance tool, the disclosed implement may be used simply to remove ground plugs and thereby to aerate a lawn. On the other hand, a tool could be used to remove plugs from a deteriorated section of lawn with subsequent replacement of removed plugs with healthier plugs transferred from another part of the same lawn or elsewhere.

The disclosed device can be used as a garden tool as well, as in creating holes for bulb or seedling planting.

It will be understood that the above-described embodiment is the preferred embodiment known to the inventor, but that the scope of protection is defined by the claims which follow.

What is claimed is:

1. A manual agricultural tool for removal of plugs from the earth, comprising:
   a shaft having a central axis;
   a handle at a top end of the shaft for manipulation of the tool; and
   a plurality of spaced apart blades rigidly secured at a lower end of the shaft by a support member extending between the blades, the blades depending downwardly of the support member and being spaced radially outwardly of the axis so as to be generally centered about the axis; and wherein
   the blades are generally parallel to the axis and each blade has an inner concave surface which surfaces together with the support member define a downwardly open receiving channel such that the blades may be axially inserted into the ground; and
   at least one blade has a tooth, a portion of which tooth spirals radially inwardly toward the axis to enhance compactment of soil received in the channel as the tool is rotated in a first direction about the axis, the tooth including a ledge having a face oriented upwardly so as to come into abutting contact with a radially outward portion of the plug of earth as the tool is withdrawn from the ground to facilitate holding of the plug within the channel during the withdrawal of the tool from the ground.

2. The tool of claim 1 wherein said inner surfaces are substantially congruent with a curved surface of an imaginary circular cylinder.

3. The tool of claim 1 wherein:
   the shaft has an open hollow passage extending from one end to the other, the tool further comprising:
   a reciprocating plunger which extends through the passage and having a lower end which protrudes into said channel, the plunger being of a length at least as great as that which spans the combined length of the shaft and blades and having an upper position in which the lower end is located at an upper end of the channel and a lower position in which the lower end is located at a bottom end of the channel;
   a spring located within the hollow passage and around a portion of the plunger coupled between the shaft and plunger to bias the plunger in the upper position; and
   a knob located at an upper end of the plunger whereby the plunger may be pushed from its upper to its lower position such that the lower end thereof moves downwardly to eject a said plug located in the channel therefrom.

4. The tool of claim 3 wherein the plunger has a radially outwardly extending abutment means located intermediate the shaft ends, there is a radially inwardly extending shaft abutment means located below the outwardly extending abutment means, and wherein the spring is a compression spring abuttingly located between said abutment means to bias the plunger into its upper position.

5. The tool of claim 1 wherein the portion of said tooth is a tip thereof.

6. The tool of claim 5 wherein the at least one blade has a first indentation and the ledge is defined along a lower edge thereof.

7. The tool of claim 6 wherein the indentation is located such that, when the tool is rotated in the first direction, the indentation is along a following edge of the blade.

8. The tool of claim 7 wherein there is a second indentation defined along the following edge of the at least one blade and a lower edge of the tooth defines an upper edge of the second indentation.

9. The tool of claim 8 wherein there are three said at least one blades.

10. The tool of claim 9 further comprising a foot support rigidly affixed to the tool at a location axially above the blades, a portion of which extends radially outwardly of the blades such that a person's foot may be located thereon for driving insertion of the blades into the ground.

11. The tool of claim 10 wherein the shaft and foot support are of metal and the blade unit and foot support are welded together and the foot support and lower end of the shaft are welded together.

12. The tool of claim 8 wherein the following edge and a leading edge of said at least one blade meet to form a lower tip of the blade shaped to facilitate insertion of the blade into the ground.

13. The tool of claim 12 wherein said lower tip is rounded.

14. The tool of claim 6 wherein said lower edge of the indentation forms an angle of between about ninety degrees plus or minus fifteen degrees with the central axis of the shaft.

15. The tool of claim 14 wherein said lower edge is approximately orthogonal to the axis.

16. The tool of claim 5 wherein an inner surface of the tip of the tooth and the circular cylinder form an angle of between about three degrees and about five degrees.

17. The tool of claim 16 wherein there are three said at least one blades circumferentially spaced evenly about the axis.

18. The tool of claim 17 wherein the three blades and the support member are manufactured as a blade unit from a single piece of metal.

19. The tool of claim 18 further comprising a foot support rigidly affixed to the tool at a location axially above the blades, a portion of which extends radially outwardly of the blades such that a person's foot may be located thereon for driving insertion of the blades into the ground.

20. The tool of claim 19 wherein outer surfaces of the blade unit are shaped to be congruent with a right circular cylinder and an underside of the foot support has a cavity shaped to abuttingly receive an upper portion of the blade unit therein.

21. The tool of claim 20 wherein the shaft and foot support are of metal and the blade unit and foot support are welded together and the foot support and lower end of the shaft are welded together.

22. A manual agricultural tool for removal of plugs from the earth, comprising:

a metal shaft having a central axis and an open hollow passage extending from one end to the other;

a handle at a top end of the shaft for manipulation of the tool;

three spaced apart metal blades rigidly secured at a lower end of the shaft by a support member extending between the blades, the blades depending downwardly of the support member and being spaced radially outwardly of the axis so as to be generally centered about the axis; and a foot support rigidly affixed to the tool at a location axially above the blades, a portion of which extends radially outwardly of the blades such that a person's foot may be located thereon for driving insertion of the blades into the ground; and wherein:

the blades are generally parallel to the axis and each blade has an inner concave surface which surfaces are shaped to be generally congruent with a curved surface of an imaginary circular cylinder and which surfaces together with the support member define a downwardly open receiving channel such that the blades may be axially inserted into the ground; and each blade has a tooth, a tip of which tooth spirals radially inwardly toward the axis to enhance compactment of soil received in the channel as the tool is rotated in a first direction about the axis, the blade having a first indentation and the tooth including a ledge defined along a lower edge of the indentation and having a face oriented upwardly so as to come into abutting contact with a radially outward portion of the plug of earth as the tool is withdrawn from the ground to facilitate holding of the plug within the channel during the withdrawal of the tool from the ground; and further comprising:

a reciprocating plunger which extends through the passage of the shaft and having a lower end which protrudes into channel, the plunger being of a length at least as great as that which spans the combined length of the shaft and blades and having an upper position in which the lower end is located at an upper end of the channel and a lower position in which the lower end is located at a bottom end of the channel;

a spring located within the hollow passage and around a portion of the plunger coupled between the shaft and plunger to bias the plunger in the upper position; and a knob located at an upper end of the plunger whereby the plunger may be pushed from its upper to its lower position such that the lower end thereof moves downwardly to eject a said plug located in the channel therefrom.

* * * * *